United States Patent
Carlson et al.

[11] Patent Number: 6,060,788
[45] Date of Patent: May 9, 2000

[54] VEHICLE DRIVER MODULE

[75] Inventors: David K. Carlson, Oakland; Thomas S. Schaffer, Clinton Township; Timothy J. Green, Holly, all of Mich.

[73] Assignee: Eaton Corporation, Cleveland, Ohio

[21] Appl. No.: 09/190,522

[22] Filed: Nov. 12, 1998

[51] Int. Cl.[7] .................................................. B60Q 1/04
[52] U.S. Cl. ......................... 307/10.8; 315/82; 340/468; 362/507
[58] Field of Search ................................. 307/10.8, 10.1, 307/9.1; 315/82; 340/468, 459; 362/507, 538; 123/479

[56] References Cited

U.S. PATENT DOCUMENTS

| | | | |
|---|---|---|---|
| 4,772,989 | 9/1988 | Haraden | 362/519 |
| 4,980,668 | 12/1990 | Leigh-Monstevens | 340/459 |
| 5,295,471 | 3/1994 | Ridgway et al. | 123/479 |
| 5,666,028 | 9/1997 | Bechtel et al. | 315/82 |
| 5,723,916 | 3/1998 | Disney et al. | 307/10.1 |
| 5,781,105 | 7/1998 | Bitar et al. | 340/468 |
| 5,945,745 | 8/1999 | Macks | 307/10.1 |

*Primary Examiner*—Albert W. Paladini
*Attorney, Agent, or Firm*—Daniel S. Kalka

[57] ABSTRACT

A vehicle driver module 10 with circuit 12 for receiving a first signal from a vehicle's controller and providing a second signal responsive thereto. The circuit 12 being placed on a substrate 14 constructed as a heat sink and preferably formed into a U-shaped configuration. A plurality of terminals 16 are attached to the substrate 14 with collars 18 made of an insulative material and having posts 20 constructed to fit within openings 50 of the substrate 14 be fastened thereto and retain the terminals 16 therein. Each of the terminals 16 include a prong 24 projecting out one side of the collar 18 and a clasp 26 out the opposite side of the collar 18. Each clasp 26 is constructed to provide a snap electrical contact at a predetermined location on the circuit on the substrate. The prongs 24 are selectively spaced so as to be received in and mesh with the standard vehicle relay junction block. The vehicle driver module 10 is a solid state, high-speed, high-power switch particularly suited for vehicle headlamps for daytime running lamp operation.

20 Claims, 3 Drawing Sheets

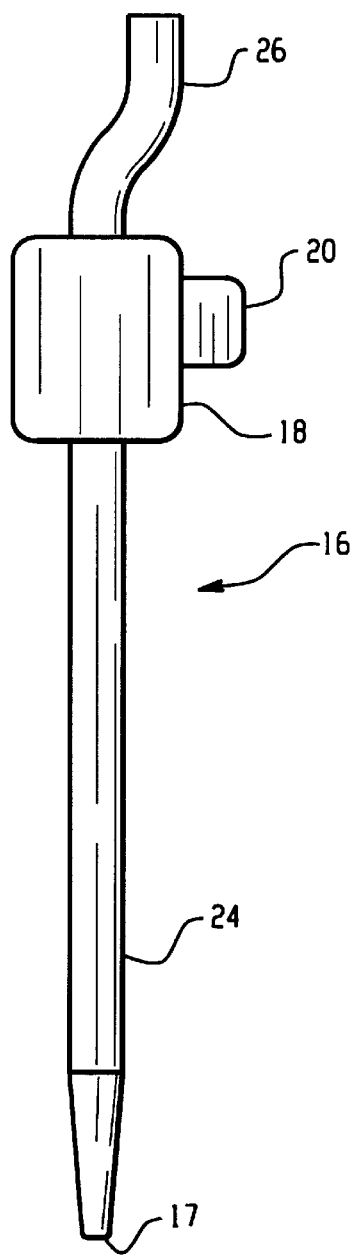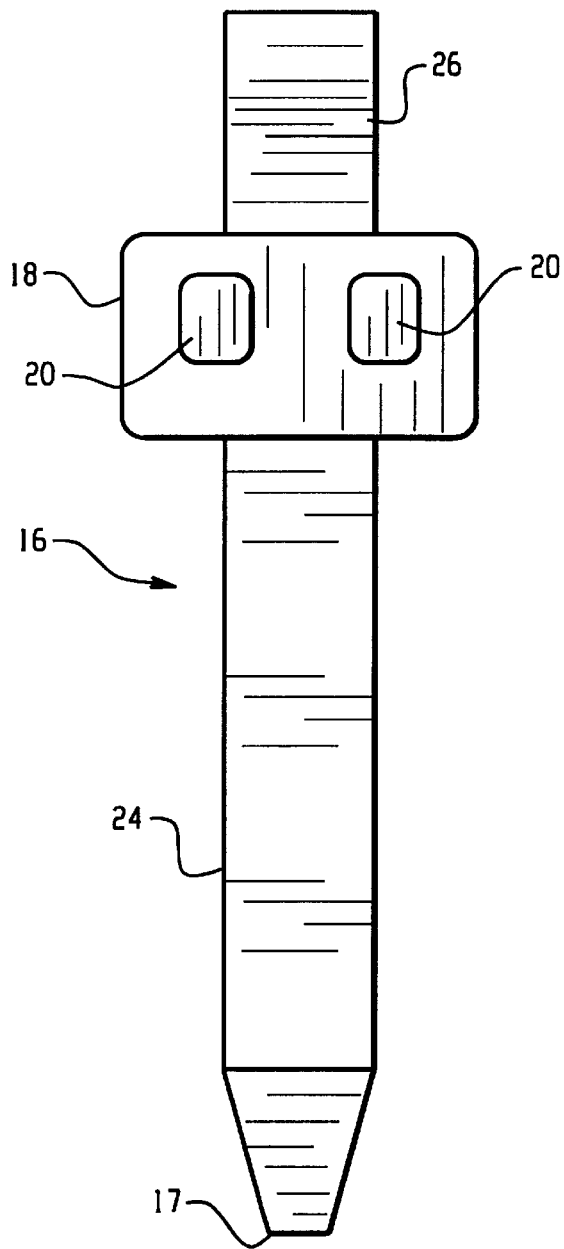

6,060,788

VEHICLE DRIVER MODULE

CROSS-REFERENCE TO RELATED APPLICATIONS

Not Applicable

STATEMENT REGARDING FEDERALLY SPONSORED RESEARCH OR DEVELOPMENT

Not Applicable

MICROFICHE APPENDIX

Not Applicable

BACKGROUND OF THE INVENTION

1. Field of the Invention

The present invention relates generally to a vehicle driver module, and more particularly to a solid state, high-speed, high-power switch intended for use in vehicle applications.

2. Description of the Related Art

Vehicles are becoming more electrically sophisticated with more safety features now standard. One example is the daytime running lamp operation found on most newer vehicles.

U.S. Pat. No. 5,666,028 relates to an automobile headlamp and running light control system. The system uses an ambient light sensor to at least in part determine whether headlights should be turned on or off.

The foregoing patent illustrates the solid state electronics currently being employed in vehicles for a variety of applications.

There still exists a need for a vehicle driver module that functions as a solid state, high-speed, and high-power switch suitable for use in a variety of vehicle applications. Preferably, such a driver module is compact in form, durable, yet still provides sufficient power for the system it is intended to operate such as controlling the intensity of vehicle headlamps for daytime running lamp operation.

SUMMARY OF THE INVENTION

The present invention is directed to solving the aforementioned problems with the prior art as well as others by providing a solid state driver designed for use in vehicle applications. The present invention provides a driver module in package form that minimizes its size and component content. The driver module comprises circuit means for receiving a first signal from the vehicle controller and provides a second signal responsive thereto. The circuit means is placed on a substrate that functions as a heat sink and is formable into a U-shaped configuration. A plurality of terminals engage the substrate through their collars. The collars snap into the substrate and secure the terminals to the substrate. They also insulate them from each other and the substrate. Each of the terminals includes a prong that projects out from the collar in fairly axial alignment with a clasp or offset portion that projects out from the opposite end of the collar. The clasps are constructed to provide electrical contact with the substrate at selected locations thereon. The prongs are selectively spaced for engagement with a standard relay in the vehicle.

Accordingly, an object of the present invention is to provide a vehicle driver module that is solid state, high-speed, and functions as a high-power switch.

Another object of the present invention is to provide a vehicle driver module that is used to control the intensity of vehicle headlamps for daytime running lamp operation.

A further object of the present invention is to provide a vehicle driver module suitable for use in a variety of vehicle applications including without limitation a pulse wiper motor driver, a window defog driver, or a viscous fan drive application.

Still a further object of the present invention is to provide a vehicle driver module that can operate at frequencies up to 1 kiloHertz (kHz).

Still a further object of the present invention is to provide a vehicle driver module that can operate with a duty cycle of 0 to 100 percent.

Still a further object of the present invention is to provide a vehicle driver module that incorporates a printed circuit board on a substrate such as aluminum which functions as a heat sink and still allows forming into a compact configuration such as a U-shape.

Yet a further object of the present invention is to provide a vehicle driver module that is rugged in construction, economical to manufacture, and durable against thermal shock, humidity or moisture, mechanical shock, vibration, mechanical crush, or terminal push/pull.

The various features of novelty which characterize the invention are pointed out with particularity in the claims annexed to and forming a part of this disclosure. For a better understanding of the invention, its operating advantages, and specific objects attained by its uses, reference is made to the accompanying drawings and descriptive matter in which a preferred embodiment of the invention is illustrated.

BRIEF DESCRIPTION OF THE DRAWINGS

FIG. 5 is a side view of the terminal 16 within collar 18; and

FIG. 6 is a frontal view of the terminal 16 within collar 18.

DETAILED DESCRIPTION OF THE INVENTION

Figure 1:
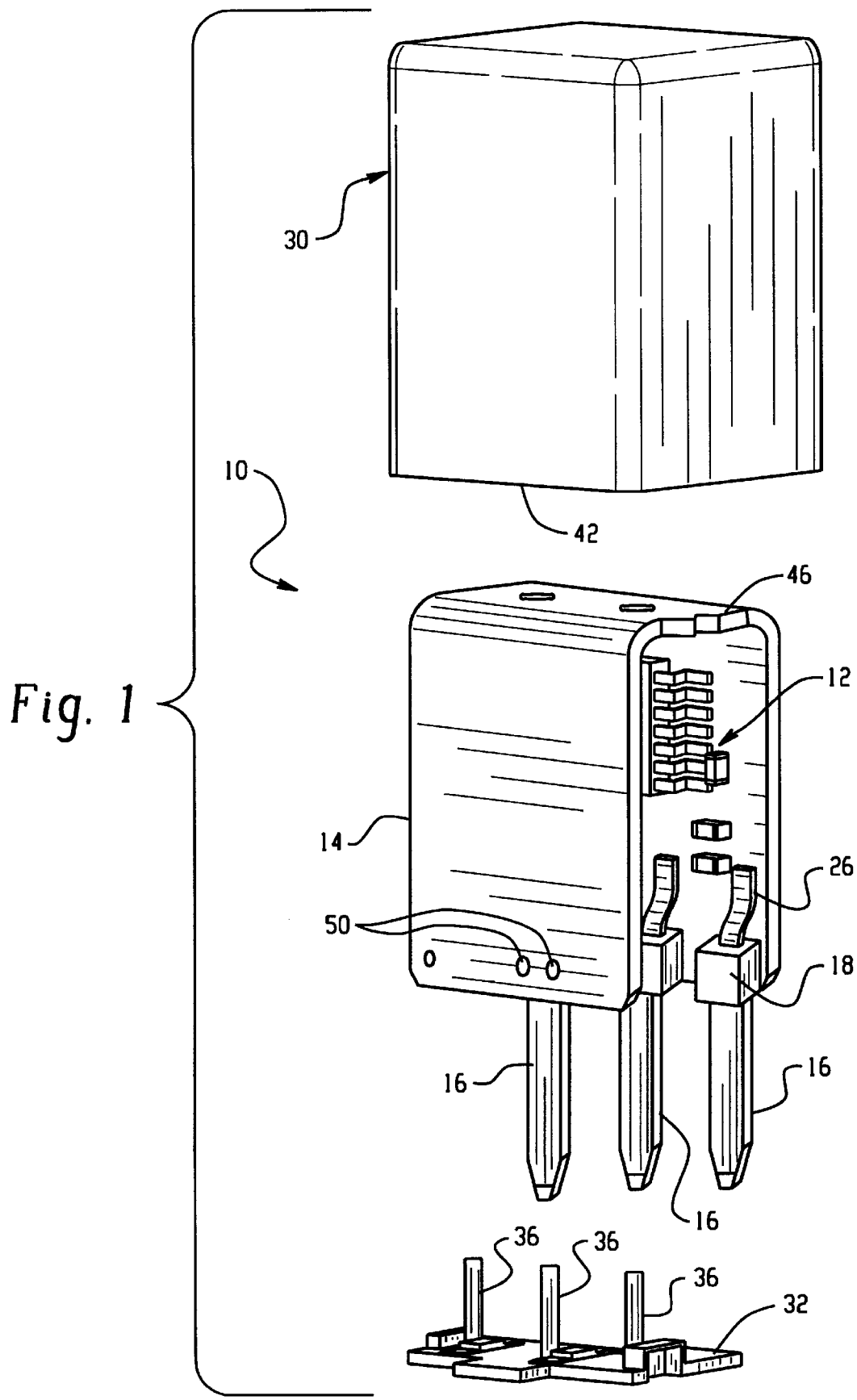
FIG. 1 is an exploded view of a vehicle driver module in accordance with the present invention.
Figure 4:
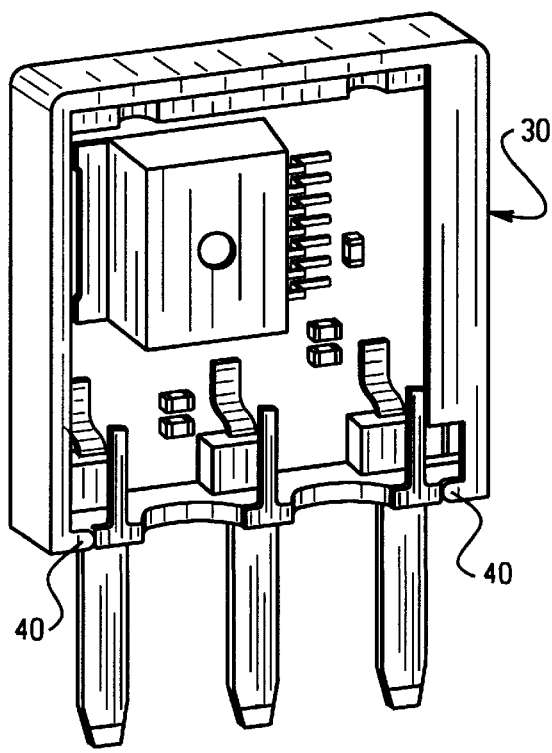
FIG. 4 is an axial cross section view of the vehicle driver module in accordance with the present invention.

Referring to the drawings where like numerals designate like or similar features throughout the several views, and first in particular to FIG. 1, there is shown a vehicle driver module generally designated 10 in an exploded view. Driver module 10 comprises a substrate 14 with a circuit 12 thereon and a plurality of terminals 16 attached thereto. Preferably, a housing 30 surrounds the substrate 14. The housing 30 is made from a nylon material with mineral fill for thin wall construction and still provides a high temperature performance. Preferably, housing 30 contains a locking tab 40 around the periphery of its open end 42 as best seen in FIG. 4. A bottom panel 32 preferably constructed of like material as the housing 30 is constructed to mesh with and be engaged by locking tabs 40 of the housing 30.

Figure 3:
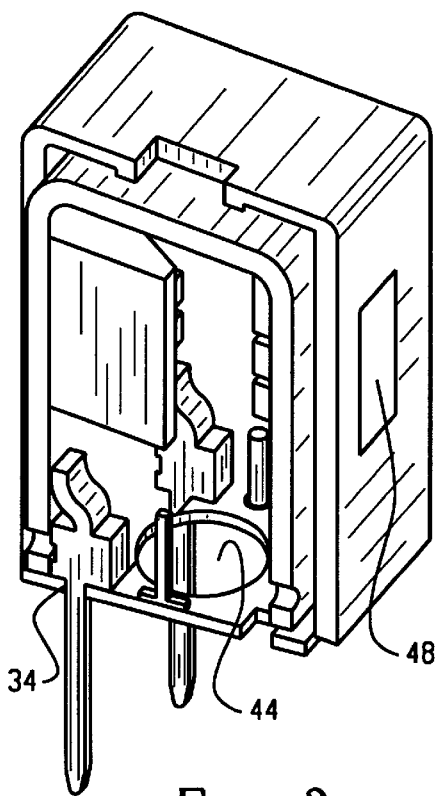
FIG. 3 is a lateral sectional view of the vehicle driver module in accordance with the present invention.

Bottom panel 32 preferably includes a plurality of apertures with a first set of apertures 34 being sized to snugly receive a terminal 16 as best seen in FIG. 3. The bottom panel 32 further includes a second set of apertures 44 that are preferably circular in shape and function as fill and breather holes for potting material. A suitable potting material such as a polyurethane and talc mixture is preferably used to fill apertures 44 for sealing the module 10. The potting material is selected for high thermal conductivity, good adhesion, and optimal temperature coefficient $C_{te}$ match. This allows for heat dissipation and still provides an extremely robust package that protects against thermal shock, humidity and/or moisture, mechanical shock, vibration, mechanical crush, and terminal push and/or pull. The bottom panel 32 may further include a plurality of projections 36 cylindrical in shape that act to retain and hold the bottom panel securely with the potting material in place in the cavity formed by the housing, substrate, and bottom panel.

The printed circuit board 12 is placed on the substrate 14 in a known manner. The substrate 14 is preferably made of aluminum to act as a heat sink and allow forming into a compact U-shaped configuration as best shown in FIG. 1. Openings 42 in the center portion of the substrate facilitate bending the substrate 14 into the U-shape. Substrate 14 may include a tab 46 shown in FIG. 1 to lock the substrate in a mating opening in housing 30.

Figure 2:
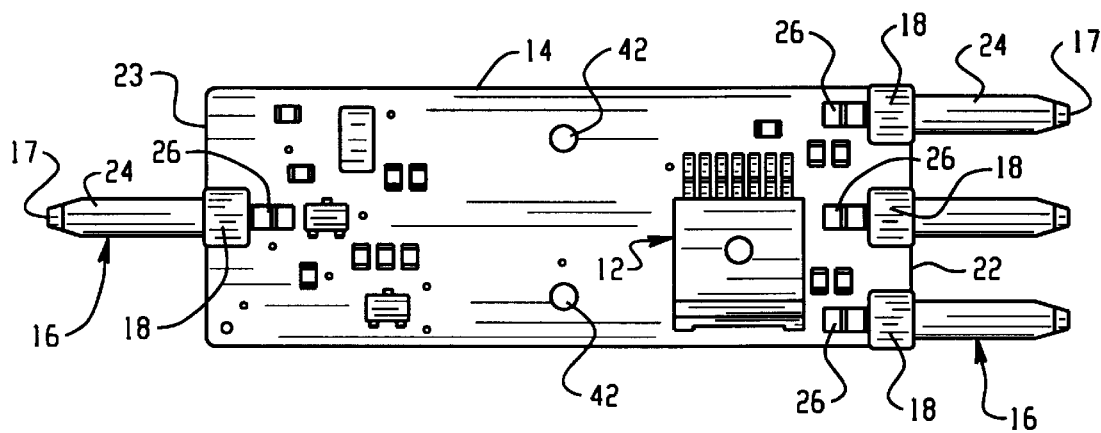
FIG. 2 is an elevated perspective flat view of the substrate and circuitry associated therewith including the plurality of terminals in accordance with the present invention.

Referring to FIG. 2, the circuit 12 components are placed on an array of substrates and re-flow soldered before singulation and forming operations on substrate 14. A plurality of terminals 16 are each preferably positioned within a collar 18 and are mounted with three terminals 16 on one edge 22 of the substrate 14 with one terminal 16 on an opposing edge 23 of the substrate 14. The plurality of terminals 16 are selectively spaced so that when the substrate 14 is formed into a U-shaped configuration, the prongs 24 of the terminals 16 will engage a standard relay footprint or vehicle relay typically found in junction blocks, such as a standard SAE J1744280 relay footprint, for example. Collars 18 are preferably made of plastic, or alternatively of a thermoplastic or insulative material, and are overmolded at a selected location on terminals 16. In the preferred embodiment, collars 18 have two posts or protrusions 20 formed therein extending out at about 90° angle relative to the prong 24. Posts 20 are formed so as to fit or snap within openings 50 in the substrate 14 and are secured therein by preferably wave-soldering or any suitable fastening means. In this manner, collars 18 function as stops and provide spacing for proper electrical contact. The posts 20 hold the terminals 16 to the substrate and retain the terminals thereto. The use of two posts 20 in the preferred embodiment provides angularity control of the terminals.

Each of the terminals 16 are preferably constructed of brass with a ½ hard tin plating and the custom design shown in the figures. The distal end 17 of the prongs 24 of terminals 16 is preferably tapered as indicated for facilitating engagement. One end of the terminal 16 that extends out from collar 18 is an offset shaped clasp 26 which is constructed to provide an electrical contact with a predetermined location on the substrate 14 by simply "snap" or "press" engagement for electrically communicating with a selected portion of the circuit 12. The prong 24 that projects out from the collar 18 is in substantial axial alignment with the clasp 26. As mentioned earlier, each prong 24 of the terminals 16 are spaced to be received and mesh with a standard relay footprint typically found in a vehicle.

Optionally, coding means 48 such as a laser bar code may be applied to an outer surface of housing 30 for providing the part number, date code, manufactured date or even a schematic. The coding may be located on different sides of housing 30, or even on the same side. This facilitates identification of the vehicle driver module and application as well as verification of the correct part for that specific relay connector or junction block.

During assembly, substrate 14 is preferably formed into a U-shape. Any suitable compact shape may be used. Prior to forming the substrate U-shape, the terminals 16 situated within collars 18 are simply snapped into their desired locations. This facilitates the assembly process. The U-shaped substrate 14, as shown in FIG. 1, slides into housing 30 and by way of tab 46 locks into housing 30. This assembly then snaps into place on bottom panel 32. The entire assembly is potted with the potting material through the fill and breather apertures 44. Once the potting material "cures", the package is extremely robust against thermal shock, humidity, moisture, mechanical shock, vibration, mechanical crush, terminal push and/or pull.

While the vehicle driver module in accordance with the present invention finds particular application as a headlamp driver module used to control the intensity of vehicle headlamps for daytime running lamp operation, it is suitable for other applications including, without limitation, a pulse wipe motor driver, window defog driver, or even as a driver module for a viscous fan drive.

The present invention uses a circuit 12 that receives a low power pulse width modulated (PWM) signal from the vehicle's body controller or on-board system controller or computer and provides a high-power, pulse width modulated signal. The vehicle driver module is designed to operate at frequencies up to 1 kiloHertz (kHz) with a duty cycle from about 0 to 100 percent (%).

In the preferred embodiment, the vehicle driver module has an on-state resistance of 8.0 milliohm, a load current of 80 amps, a drain to source breakdown of 55 volts, thermal shutdown at 165° C., an operating temperature of from −40° C. to +105° C., a parasitic current draw of 356 microamps, and an operating current draw of 50 milliamps. The vehicle driver module is electrostatically discharge (ESD) protected and includes an input/output protection from shorts to ground and battery. The vehicle driver module further includes reverse battery protection.

While a specific embodiment of the invention has been shown and described in detail to illustrate the application of the principles of the invention, it will be understood that the invention may be embodied otherwise without departing from such principles. As one example, the substrate may be formed in any desired configuration that fits within a housing. Alternately, the substrate may include an outer insulative covering which eliminates the need for a housing.

We claim:

1. A vehicle driver module, comprising:

a circuit for receiving a first signal from a controller and providing a second signal responsive thereto, said circuit being placed on a substrate constructed as a heat sink and formed into a desired configuration; and a plurality of terminals, each of said terminals being positioned within a collar, said collar including a post for engagement with an opening in the substrate for retaining said terminal to the substrate, said collar being made of an insulative material, each of said terminals having a prong projecting out from said collar and a clasp projecting out from an opposite side of said collar, each of said clasps being constructed to provide an electrical contact with a predetermined location on said substrate for electrically communicating with selected portions of said circuit, said prongs being selectively spaced for engagement with a relay in the vehicle.

2. A vehicle driver module as recited in claim 1, further comprising a housing for encasing, the vehicle driver module, said housing including coding means positioned thereon for identifying the vehicle driver module.

3. A vehicle driver module as recited in claim 1, wherein said collar comprises two posts for retaining said terminal to the substrate.

4. A vehicle driver module as recited in claim 3, wherein said substrate is made of aluminum, and the desired configuration is a U-shape.

5. A vehicle driver module as recited in claim 4, further comprising a housing for covering said substrate.

6. A vehicle driver module as recited in claim 5, further comprising a bottom panel, said bottom panel having a plurality of apertures, some of said apertures being selectively spaced for snugly receiving said prongs, said bottom panel further including a plurality of projections directed towards said substrate, said bottom panel being constructed to mesh with said housing for defining a chamber with said housing for said substrate.

7. A vehicle driver module as recited in claim 6, further comprising potting material placed within some of said apertures in said bottom panel, said potting material filling said chamber and further being a heat sink material.

8. A vehicle driver module as recited in claim 7, further comprising coding means for identification positioned on an outer surface of said housing.

9. A vehicle driver module as recited in claim 7, wherein said first signal comprises a low power pulse width modulated signal and said second signal comprises a high power pulse width modulated signal.

10. A vehicle driver module as recited in claim 9, wherein said vehicle driver module operates at frequencies up to and including 1 kHz.

11. A method for making a vehicle driver module, comprising the steps of:

placing a circuit on a formable substrate;

attaching a plurality of terminals in preset locations on the substrate, each of the terminals having a collar with a prong projecting out from the collar in one direction and a clasp projecting out from the collar in substantial axial alignment in an opposition direction;

forming the substrate into a predetermined configuration;

positioning the substrate into a housing; and placing a bottom panel over the prongs of the terminals for engagement with the housing, the prongs being selectively spaced for meshing with a standard vehicle relay.

12. A method as recited in claim 11, further comprising the step of filling a cavity defined by the housing, substrate, and bottom panel with a potting material.

13. A method as recited in claim 12, further comprising the step of connecting the vehicle driver module into a relay of a vehicle.

14. A method as recited in claim 13, further comprising the step of receiving a low power signal from a controller within the vehicle, and providing a high power signal to a selected device therein.

15. A method as recited in claim 14, further comprising the step of operating the vehicle driver module at frequencies up to and including 1 kHz.

16. A method as recited in claim 14, further comprising the step of operating the vehicle driver module with a duty cycle from about 0 to 100 percent(%).

17. An electrical terminal for contact with a circuit on a substrate comprising:

a collar made of an insulative material, said collar having a post for engagement with an opening in the substrate;

a prong projecting out from said collar, said prong being constructed to mesh with a vehicle relay; and a clasp projecting out from an opposite side of said collar, said clasp being in substantial axial alignment with said prong and having a portion offset therefrom, said offset portion being constructed to electrically contact a selected portion of the circuit on the substrate.

18. An electrical terminal as recited in claim 17, wherein said collar includes two posts, said posts being situated at approximately a right angle relative to said prong.

19. An electrical terminal as recited in claim 18, wherein said prong includes a tapered distal end.

20. An electrical terminal as recited in claim 19, wherein said collar is made of plastic.

* * * * *